Aug. 26, 1952      L. A. KRIDER      2,608,314
BOAT CARRIER

Filed March 30, 1951      2 SHEETS—SHEET 1

INVENTOR
L. A. Krider,
BY
David H. Eckroad.
ATTORNEY

Aug. 26, 1952 — L. A. KRIDER — 2,608,314
BOAT CARRIER
Filed March 30, 1951 — 2 SHEETS—SHEET 2
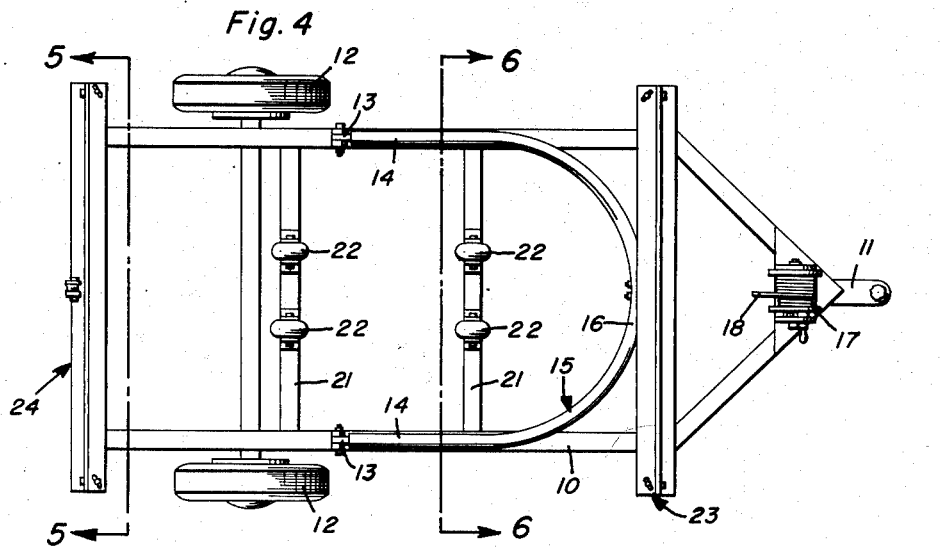
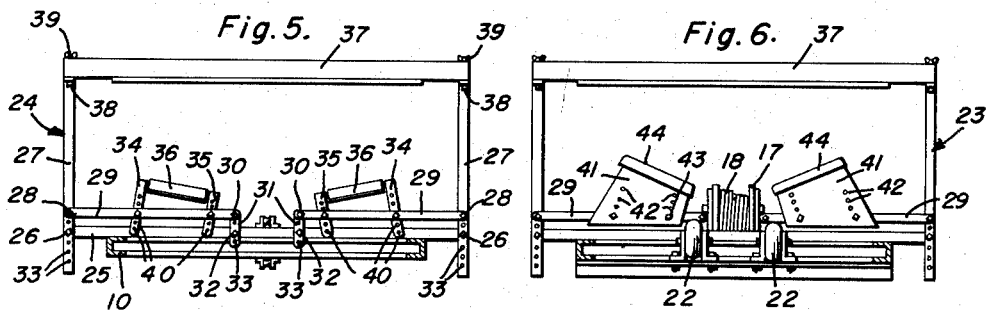
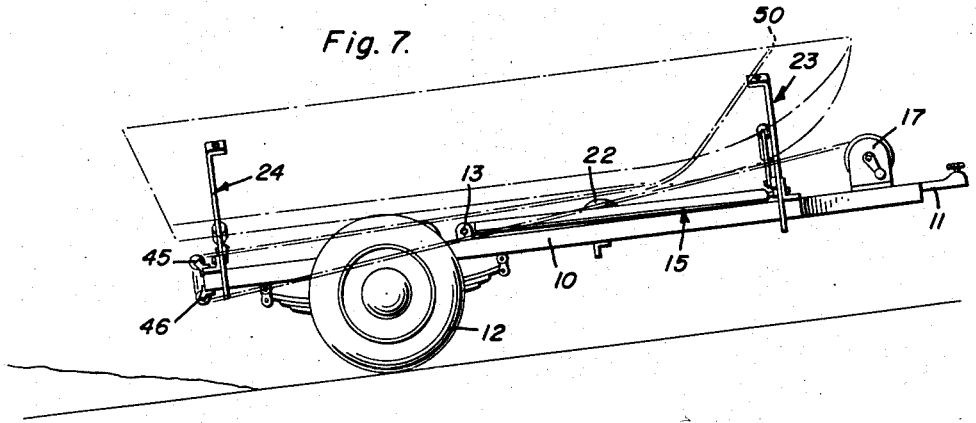
INVENTOR
L. A. Krider
BY David H. Ochrout
ATTORNEY Patented Aug. 26, 1952

2,608,314

UNITED STATES PATENT OFFICE 2,608,314

BOAT CARRIER

Lanta A. Krider, Coeur d'Alene, Idaho

Application March 30, 1951, Serial No. 218,355

1 Claim. (Cl. 214—84)

The present invention relates to a loading and unloading apparatus for boat carrying trailers and it consists in the combinations, constructions and arrangements of parts herein described and claimed.

Generally there is provided a trailer designed to carry boats and which trailer is provided with an apparatus whereby the same may be lifted out of the water onto the trailer and thereafter drawn to a position atop suitable chocks and lashed into position. Means is also provided in the same apparatus for unloading the boat when it is so desired.

It is accordingly an object of the invention to provide an apparatus of the character set forth which is simple in construction, inexpensive to manufacture and yet effective and efficient in use.

A further object of the invention is the provision of novel supporting rollers forming a part of the invention.

A further object of the invention is the provision of novel means for lashing a boat in position upon a trailer forming a part of the invention.

Another object of the invention is the provision of novel winch-operated means for loading and unloading a trailer of the character set forth.

Other and further objects of the invention will become apparent from a reading of the following specification taken in conjunction with the drawings, in which:

Figure 1 is a side elevational view of an embodiment of the invention shown in the position at the beginning of a loading operation, Figure 2 is a view similar to Figure 1 but showing the position the apparatus will assume when a boat is partially loaded thereon, Figure 3 is a view similar to Figures 1 and 2 but showing the position the apparatus will assume when the boat has been fully loaded and lashed thereon, Figure 4 is a plan view of Figure 3.

Figure 5 is a sectional view taken substantially along line 5—5 of Figure 4,

Figure 6 is a sectional view taken substantially along line 6—6 of Figure 4,

Figure 7 is a view similar to Figures 1 to 3, inclusive, but showing the apparatus as it will appear at the beginning of an unloading operation.

Figure 1:
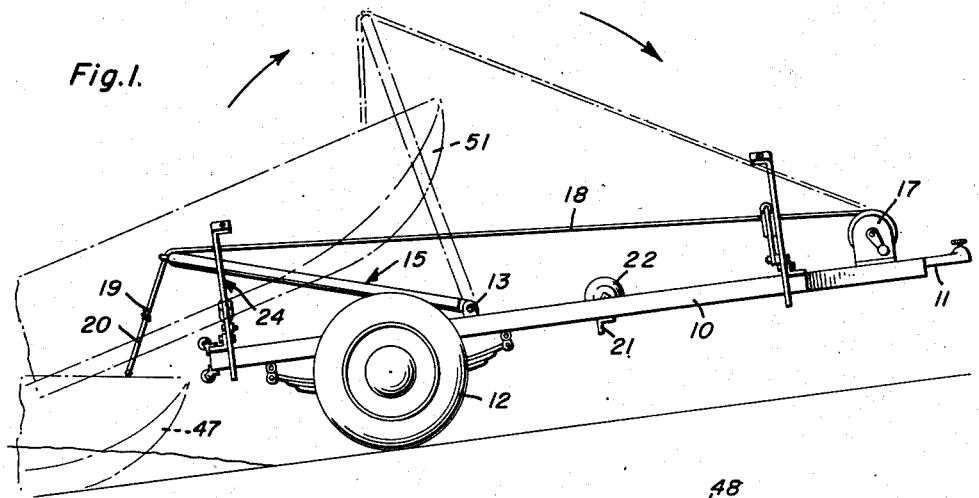

Referring more particularly to the drawings, there is shown therein a trailer provided with a conventional platform 10, drawbar 11 and supporting wheels 12. Slightly rearwardly of the central portion of the platform 10 there is pivotally connected, as indicated at 13, at either side of the platform 10 each of the legs 14 of an inverted U-shaped boom generally indicated at 15, and whose bight portion 16 is therefore adapted to swing forwardly and rearwardly upon a transverse axis defined by the pivotal points 13.

A winch 17 which may be either hand powered or motor driven is affixed atop the platform 10 adjacent the forward end thereof and is provided with a cable 18 whose free end has affixed thereto, as indicated at 19, a pair of auxiliary cables 20.

The platform 10 is provided, intermediate its forward and rearward ends, with a pair of spaced cross bars 21 upon each of which is revolubly mounted a pair of spaced supporting rollers 22 each of which is preferably and as shown rubber tired and it will be seen that each roller 22 of each pair is in longitudinal alignment with a corresponding roller 22 of the other pair of such rollers and that the longitudinal axis of the trailer passes equidistantly between the rollers of each pair of rollers 22.

Mounted upon the platform 10 is a forward chock construction generally indicated at 23 and a rearward chock construction generally indicated at 24. The rear chock construction 24 is shown in detail in Figure 5 while the front chock construction 23 is shown in detail in Figure 6.

Referring now to Figure 5 of the drawings, it will be seen that the rear chock construction consists of a transversely extending bar 25 which is affixed atop the platform 10 and whose ends extend a short distance beyond the sides of the platform 10. To each of the outer ends of the bar 25 there is pivotally connected by means of a bolt 26 or the like a vertically extending arm 27 each of which has pivotally connected thereto by means of a bolt 28 a horizontally extending arm 29 which overlies the bar 25 in spaced relation thereto. Each of the arms 29 extends inwardly to a point adjacent the longitudinal axis of the apparatus and each has its inner end pivotally connected by means of a bolt 30 or the like to a relatively short vertically extending arm 31. The arms 31 are, in turn, pivotally connected to the bar 25 by means of bolts 32. The arms 27 and 31 are each provided with a plurality of spaced openings 33 whereby vertical adjustment of the members 29 may be effectuated with respect to the bar 25. A pair of spaced upwardly and inwardly extending arms 34 and 35 pivotally connect the arms 29 with the bar 25, the arms 35 in each case being relatively shorter than the arms 34 and the upper ends of each pair of arms 34 and 35 are interconnected by a roller 36 each of which extends angularly inwardly and downwardly toward the longitudinal axis of the apparatus. A clamping bar 37 is removably affixed at each of its ends to the upper ends of the arms 27 by means of bolts 38 and thumbscrews 39.

The arms 34 and 35 are in each case provided with a plurality of spaced openings 40 whereby vertical adjustment of the same may be effectuated.

In the forward chock construction shown in Figure 6 identical parts with those in Figure 5 will be given identical reference characters and it will be seen that the sole difference in the forward chock construction is the provision of a pair of plates 41 each of which is provided with a series of openings 42 whereby the same may be adjustably connected with the arms 29 by means of bolts 43 or the like. The upper edges of each of the plates 41 is inclined inwardly and downwardly toward the longitudinal axis of the apparatus and each of such upper edges is provided with a buffer 44 of rubber or the like.

The rear end of the platform 10 is provided centrally with an upwardly extending pulley 45 and a downwardly extending pulley 46.

Figure 2:
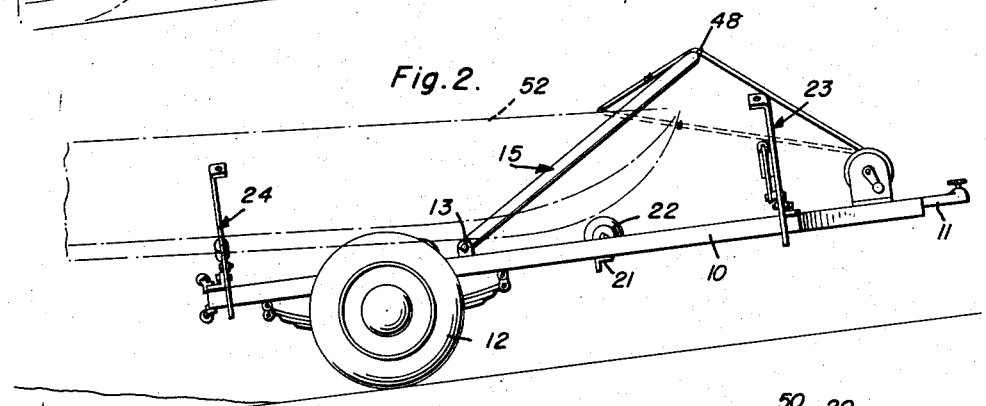
Figure 3:
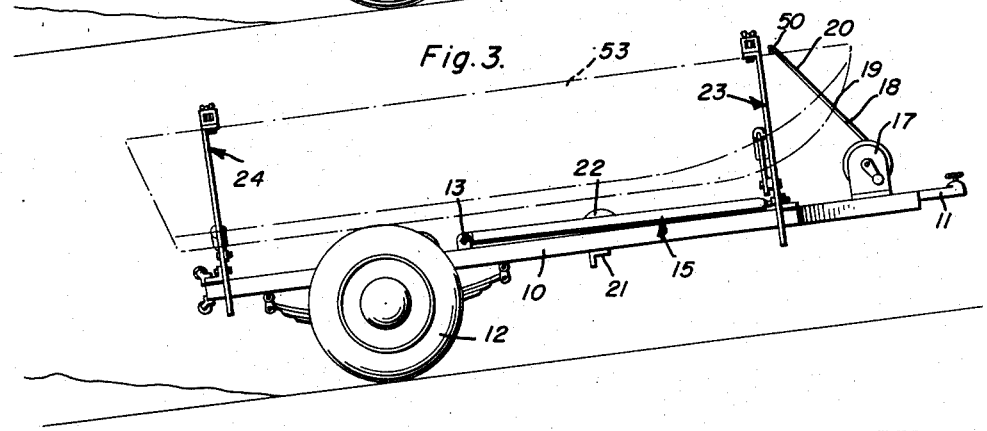
Figure 8:
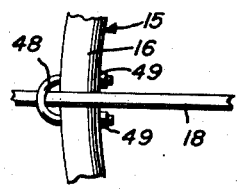
Figure 8 is a fragmentary elevational view illustrating certain details of construction.

In operation, it will be apparent that when it is desired to lift a boat indicated in dotted lines at 47 in Figure 1 where the same is shown as resting in water, to a position atop the trailer, it is only necessary to extend the cable 18 through a U-bolt 48 affixed centrally on the bight portion 16 of the boom 15 and which is provided with nuts 49. The auxiliary cables 20 are then connected with eye bolts 50 provided at either side of the upper part of the prow of the boat whereupon the nuts 49 are tightened to thereby lock the boom 15 with the cable 18. Thereupon the winch 17 is actuated to thread the cable 18 inwardly to thereby draw the boat from its position indicated at 47 upwardly to a position such as is indicated, for example, at 51 in Figure 1, since the boom 15 will have now rotated in a clockwise direction upon its pivotal point 13 as shown in dotted lines in Figure 1. The underside of the boat will now rest upon the rollers 36. Further actuation of the winch 17 will draw the boat inwardly upon the platform 10 to the position indicated, for example at 52, in Figure 2 at which time the forward portion of the boat will rest upon the rollers 22 by gravity after which the cable 18 may be freed from the boom 15 by releasing the eye bolt 48 from the said boom. Thereupon the further actuation of the winch will act to draw the boat forwardly to a point where the underside of the prow will rest upon the forward chock construction 23, as indicated at 53 in Figure 3. At this time the boom 15 will have been freed from the cable 18 and the same may be locked in its forward position shown in Figure 3.

After the above operations have taken place, the arms 27 of both the forward and rearward constructions 23 and 24 are moved inwardly and the members 27 will be connected by means of the bolts 38 and wing nuts 39 to the upper ends of the arms 27. This action will cause the rollers 36 to rise against the bottom of the rear portion of the boat and at the same time will cause the chocks 41 and their buffers 44 to rise against the bottom of the forward part of the boat to thereby securely hold the same in position upon the trailer. It will be apparent that the chock plates 41 may be adjusted vertically and that the rollers 36 may be adjusted vertically as heretofore described so that the boat may be held securely in position upon the trailer when the arms 27 are moved inwardly as aforesaid.

When it is desired to remove the boat from the trailer, it is only necessary to extend the cable 18 downwardly to the pulley 46 and thence upwardly to the pulley 45 and thence rearwardly again to the eye bolts 50, whereupon actuation of the winch 17 will cause a reversal of the action above described to thereby force the boat rearwardly from the trailer, the bars 37 having previously been removed from their connections with the arms 27 and the arms 27 having been swung outwardly to the positions shown, for example, in Figure 7 of the drawings. It will also be apparent that instead of the U-bolt 48, some other means may be provided for locking the cable 18 to the boom 15.

While but one form of the invention has been shown and described herein, it will be readily apparent to those skilled in the art that many minor modifications may be made without departing from the spirit of the invention or the scope of the appended claim.

What is claimed is:

An apparatus of the character described, in combination with a trailer having a platform and supporting wheels, the provision of an inverted U-shaped boom having a bight portion and a pair of legs, said legs being pivotally connected to either side of said platform rearwardly of the center thereof, a winch mounted at the forward end of said platform, a main cable wound upon said winch, a pair of auxiliary cables attached to the free end of the main cable, an upper pulley attached to the rear of said platform, a lower pulley attached to the rear of said platform, a lock for said main cable mounted at the center of said bight portion of said boom, a forward chock assembly mounted upon said platform, a rearward chock assembly mounted on said platform, said forward assembly including a pair of chock plates, said rearward assembly including a pair of supporting rollers, a clamping bar associated with each of said assemblies and adapted to bear against the upper side of a boat supported by said assemblies, means for raising and lowering said supporting rollers and said chock plates, said means including a vertically extending arm at each side of each of said assemblies, and linkage and levers interconnecting each of said vertical arms and their associated plates and supporting rollers, said platform being centrally provided with a plurality of pairs of guide rollers.

LANTA A. KRIDER.

REFERENCES CITED

The following references are of record in the file of this patent:

UNITED STATES PATENTS

| Number | Name | Date |
|---|---|---|
| 2,442,994 | Clary | June 8, 1948 |
| 2,503,535 | Yarbrough | Apr. 11, 1950 |
| 2,558,418 | Brueckman | June 26, 1951 |
| 2,571,361 | Harmanson | Oct. 16, 1951 |

FOREIGN PATENTS

| Number | Country | Date |
|---|---|---|
| 496,549 | Great Britain | Nov. 28, 1938 |